(12) United States Patent
Cavaliere et al.

(10) Patent No.: US 12,459,218 B2
(45) Date of Patent: Nov. 4, 2025

(54) STIFFENING STRUCTURE INTENDED TO STIFFEN A COMPONENT MADE OF THERMOSETTING COMPOSITE MATERIAL, AND ASSOCIATED STIFFENING METHOD

(71) Applicant: ArianeGroup SAS, Les Mureaux (FR)

(72) Inventors: Frederick Cavaliere, Montigny le Bretonneux (FR); Thomas Dericquebourg, Paris (FR); Fabrice Aumont, Mantes la Jolie (FR); Laurent Amrouche, Serifontaine (FR); Benjamin Demeure, Vernouillet (FR)

(73) Assignee: ArianeGroup SAS, Les Mureaux (FR)

( * ) Notice: Subject to any disclaimer, the term of this patent is extended or adjusted under 35 U.S.C. 154(b) by 160 days.

(21) Appl. No.: 18/005,113

(22) PCT Filed: Jul. 16, 2021

(86) PCT No.: PCT/FR2021/051339
§ 371 (c)(1),
(2) Date: Jan. 11, 2023

(87) PCT Pub. No.: WO2022/013512
PCT Pub. Date: Jan. 20, 2022

(65) Prior Publication Data
US 2023/0264438 A1  Aug. 24, 2023

(30) Foreign Application Priority Data
Jul. 17, 2020  (FR) ........................................ 2007520

(51) Int. Cl.
*B29C 70/74* (2006.01)
*B29C 70/68* (2006.01)
(Continued)

(52) U.S. Cl.
CPC ............. *B29C 70/682* (2013.01); *B29C 70/84* (2013.01); *B64C 1/064* (2013.01); *H01Q 1/288* (2013.01);
(Continued)

(58) Field of Classification Search
CPC ....... B29C 70/84; B29C 70/845; B29C 70/74; B29C 70/78; B29C 2043/3621
See application file for complete search history.

(56) References Cited

U.S. PATENT DOCUMENTS 4,395,450 A * 7/1983 Whitener ................ B29C 70/08
428/116
4,671,470 A * 6/1987 Jonas .................. B29C 66/1142
428/116

(Continued)

FOREIGN PATENT DOCUMENTS

| EP | 2889123 A1 | 7/2015 |
| WO | 0216784 A2 | 2/2002 |
| WO | 2012091695 A1 | 7/2012 |

OTHER PUBLICATIONS

Chen, Y., J. Lu, Q. Guo, L. Wan, 3D printing of CF/nylon composite mold for CF/epoxy parabolic antenna, Journal of Engineered Fibers and Fabrics, vol. 15, No. 1-7 (2020), 7 pages. (Year: 2020).*
(Continued)

*Primary Examiner* — Matthew J Daniels
(74) *Attorney, Agent, or Firm* — McDonald Hopkins LLC

(57) ABSTRACT

Structure intended to stiffen a component made of thermosetting composite material by being fitted to at least one of its surfaces, including: at least one longitudinal body, with first and second longitudinal edge faces on opposite sides, and first and second lateral faces on opposite sides; at least one base including at least one mounting base, each base having a plate and first and second tongues which delimit, with the plate, a housing for at least one body, the first and
(Continued)

second tongues extending from a main face of the plate and being pressed respectively against the first and second lateral faces of the body. Each mounting base has a plate which is secured to the first longitudinal edge face of a body and which is intended to be pressed against the surface of the component to be stiffened. Each body and each base are made of thermosetting composite material.

11 Claims, 7 Drawing Sheets

(51) Int. Cl.
    *B29C 70/84*     (2006.01)
    *B64C 1/06*     (2006.01)
    *H01Q 1/28*     (2006.01)
    *B29K 101/10*     (2006.01)
    *B29K 105/08*     (2006.01)
    *B29L 31/34*     (2006.01)

(52) U.S. Cl.
    CPC .. *B29K 2101/10* (2013.01); *B29K 2105/0872* (2013.01); *B29L 2031/3456* (2013.01)

(56) References Cited

U.S. PATENT DOCUMENTS

| | | | | |
|---|---|---|---|---|
| 5,476,704 | A * | 12/1995 | Kohler | B29C 66/721 |
| | | | | 244/119 |
| 5,817,269 | A * | 10/1998 | Younie | B29C 33/38 |
| | | | | 249/82 |
| 6,520,706 | B1 | 2/2003 | McKague, Jr. et al. | |
| 6,874,543 | B2 * | 4/2005 | Schmidt | B29B 11/16 |
| | | | | 442/205 |
| 8,235,671 | B2 * | 8/2012 | Yarbrough | F03D 1/065 |
| | | | | 416/241 R |
| 11,806,950 | B2 * | 11/2023 | Vichniakov | B29C 70/541 |
| 2003/0037867 | A1 * | 2/2003 | Bersuch | B29C 65/4865 |
| | | | | 156/303.1 |
| 2017/0021575 | A1 * | 1/2017 | Hansen | B29C 70/22 |

OTHER PUBLICATIONS

International Search Report for Application No. PCT/FR2021/051339 dated Oct. 20, 2021.
Written Opinion for PCT/FR2021/051339 dated Oct. 20, 2021.

* cited by examiner

STIFFENING STRUCTURE INTENDED TO STIFFEN A COMPONENT MADE OF THERMOSETTING COMPOSITE MATERIAL, AND ASSOCIATED STIFFENING METHOD

This is the National Stage of PCT international application PCT/FR2021/051339, filed on Jul. 16, 2021 entitled "IMPROVED STIFFENING STRUCTURE INTENDED TO STIFFEN A COMPONENT MADE OF THERMOSETTING COMPOSITE MATERIAL, AND ASSOCIATED STIFFENING METHOD", which claims the priority of French Patent Application No. 2007520 filed Jul. 17, 2020, both of which are incorporated herein by reference in their entirety.

TECHNICAL FIELD

The invention relates to a stiffened structural component, wherein the mode of stiffening is integrated on at least one of the faces of the component made of thermosetting composite material.

The invention may apply for the stiffening of any components made of thermosetting composite material that must have a significant dimensional stability under mechanical or thermal stresses and/or a significant stiffness. The invention thus applies to all technical fields that require components of complex shapes; it may for example concern structural components in the space field (for example, satellite antenna reflector, satellite platform structure, dispenser (structure that is used to support a plurality of satellites at the same time and eject these satellites once in orbit according to an order defined in advance), composite inter-stage structures, composite containers, etc.) or aeronautics field (for example, fuselage panels, airfoil panels, landing gear flaps, access hatches, etc.) and may apply to the road, air, rail and maritime transport fields.

PRIOR ART

Some structure components (also called structural components) need to be stiffened. In order to illustrate the problem that arises during the production of such components, we will describe the particular case of the production of a structural component of the satellite antenna reflector type.

Currently, satellite antenna reflectors include a shell made of composite material that is assembled, after polymerisation, to a stiff rear structure. The shell has a complex double-curved shape; the rear structure, for its part, consists of an assembly of tubes, of sleeves (making it possible for a joint between the tubes) and bonding means of the bracket type (making it possible for a joint between the rear structure and the satellite).

The assembly of the stiff rear structure with the shell is performed via bonding means of the angle iron type made of composite material having an L-shape. The rear structure has a different shape from the shell and therefore is not directly in contact with the shell during the assembly operation. One end of the angle irons is bonded to the rear structure and the other end is bonded to the shell. The angle and the width of the angle irons must be selected in such a way as to make a good contact possible with the rear face of the shell (double curve). Each bonding component of the angle iron type must therefore be adapted, particularly to the curve at the interface with the shell, which implies having available a large number of different components and a lot of time for selecting the suitable component.

Furthermore, all of the bondings are performed manually, by using a paste adhesive, at ambient temperature (what is commonly known as cold bonding is carried out).

In the end, this mode of stiffening and of assembling is particularly complex and time consuming, since it requires the manufacture of numerous components (tubes, sleeves, very high number of types of angle irons) and requires numerous and meticulous assembly operations by manual bonding at ambient temperature (assembly of tubes/sleeves for producing the rear structure, and assembly of the shell/structure with the aid of angle irons), which has an impact on the cost of the stiffened structural components thus obtained.

Therefore, there is a need to simplify the operations for stiffening the shell and assembling the various components, while maintaining a high reliability of the adhesive bonds.

It is reminded that this problem was described in the particular case of satellite antenna reflectors, but arises generally with any structural component that must be stiffened by being assembled with a set of stiffeners and having a variable bonding interface (due to a bonding interface with variable curve, most often with double curve, and that may be different according to the assembly positions).

The objective of the invention is to propose a mode of stiffening that makes it possible to easily adapt to complex specific shapes of structural components to be stiffened, while reducing the manufacturing costs by drastically reducing the number of elements needed for stiffening a structural component and by reducing the various operations for bonding these elements on the component.

DISCLOSURE OF THE INVENTION

To this end, the invention proposes a stiffening structure intended to stiffen a component made of thermosetting composite material by being fitted to at least one of its surfaces, the stiffening structure being characterised in that it comprises:
  at least one body extending in a longitudinal direction, each body having a first and a second longitudinal edge face on opposite sides, and a first and a second lateral face on opposite sides;
  at least one base including at least one mounting base, each base being provided with a plate and a first and a second tongue which delimit, with the plate, a housing for at least one body, the first and the second tongue extending from a main face of the plate and being pressed respectively against the first and the second lateral face of the body;
  and being characterised in that each base the plate of which is secured to the first longitudinal edge face of a body is a mounting base, the plate of each mounting base being intended to be pressed against the surface of the component to be stiffened; and
  in that each body and each base are made of thermosetting composite material.

Some preferred but non-limiting aspects of the stiffening structure are the following:
  each body is oriented orthogonally in relation to the plate of each cover base;
  each body may be of the monolithic type (for example, a monolithic plate) or of the sandwich type with a core and two skins on either side of the core;

each body is provided with at least one cover base and at least one mounting base, a cover base being a base the plate of which is secured to the second longitudinal edge face of a body;

when the stiffening structure comprises a plurality of bodies, at least one base is disposed straddling at least two adjacent bodies in order to secure them;

when the stiffening structure comprises a plurality of bodies, each body is connected to at least one adjacent body by at least one base;

the housing of the base disposed straddling at least two adjacent bodies has a cross shape; the cross is formed of two branches that intersect at more or less open angles, preferably at right angles;

the base disposed straddling at least two adjacent bodies is a cover base;

the first edge face of at least one body has a single curve or a double curve;

the second edge face of at least one body is straight.

The invention also relates to a method for stiffening a component by a stiffening structure such as described above, the component being made of a composite material the thermosetting resin of which is not polymerised or partially polymerised, the method comprising the following successive steps of:

a) supplying the body(ies) made of thermosetting composite material of the stiffening structure;

b) for each mounting base of the stiffening structure, performing the following successive operations:

forming a non-polymerised plate by draping layers of fibrous reinforcement pre-impregnated with a thermosetting resin on the surface of the component to be stiffened;

placing at least one body on the main face of the non-polymerised plate, the first longitudinal edge face of each body being pressed against the main face of the plate;

forming the first and second tongues, respectively, by draping first layers of fibrous reinforcement pre-impregnated with a thermosetting resin on a first portion of the main face of the plate and rising up on the first lateral face of the body, and by draping second layers of fibrous reinforcement pre-impregnated with a thermosetting resin on a second portion of the main face of the plate, different from the first portion, and rising up on a second lateral face of the body;

c) securing each mounting base with the surface of the component to be stiffened and of the body(ies) by totally polymerising the thermosetting resin of the plate, of the first and second tongues and of the component.

According to one variant, for at least one mounting base, step b) is replaced by performing the following successive operations:

forming a non-polymerised plate by draping layers of fibrous reinforcement pre-impregnated with a thermosetting resin on the surface of the component to be stiffened;

placing an impression tool on the main face of the non-polymerised plate;

forming the first and second tongues, respectively, by draping first layers of fibrous reinforcement pre-impregnated with a thermosetting resin on a first portion of the main face of the plate and rising up on a first lateral face of the impression tool, and by draping second layers of fibrous reinforcement pre-impregnated with a thermosetting resin on a second portion of the main face of the plate, different from the first portion, and rising up on a second lateral face of the impression tool;

partially polymerising the thermosetting resin of the component, of the plate and of the first and second tongues;

removing the impression tool, whereby a housing is formed for at least one body;

depositing an adhesive layer in the housing on the main face of the partially polymerised plate;

placing at least one body in the housing on the adhesive layer, the first longitudinal edge face of each body being pressed against the adhesive layer of the main face of the plate.

According to one variant that will be described in detail below, it is also possible to produce beforehand mounting bases on a mould, to carry out semi-curing of the mounting bases (partial polymerisation cycle), to remove the mould, then to place the mounting bases on a raw or semi-cured component to be stiffened, in order to finally perform a total polymerisation (final curing) after positioning in the mounting bases the polymerised bodies with or without cover bases. According to another variant that will be described in detail below, it is also possible to produce beforehand mounting bases on a mould, to place the polymerised bodies with or without cover bases in these mounting bases, then to carry out a semi-curing, remove the mould, and place the stiffening structure thus obtained on a raw or semi-cured component to be stiffened in order to finally perform a total polymerisation.

According to one variant, when the stiffening structure includes at least one cover base, the method further comprises, before the operation of placing at least one body on the main face of the non-polymerised plate, forming said at least one cover base with, for each cover base, performing the following successive operations:

forming a non-polymerised plate by draping layers of fibrous reinforcement pre-impregnated with a thermosetting resin on a mould;

totally polymerising the thermosetting resin of the plate;

depositing a first adhesive layer on the main face of the polymerised plate;

placing at least one body on the first adhesive layer, each body being positioned on the main face of the polymerised plate, preferably orthogonally to said main face, the second longitudinal edge face of each body being pressed against the first adhesive layer of the main face of the plate;

depositing a second adhesive layer on the first and second lateral faces of each body;

forming the first and second tongues, respectively, by draping first layers of fibrous reinforcement pre-impregnated with a thermosetting resin on a first portion of the main face of the plate covered by the first adhesive layer and rising up on the first lateral face of the body covered with the second adhesive layer, and by draping second layers of fibrous reinforcement pre-impregnated with a thermosetting resin on a second portion of the main face of the plate covered by the first adhesive layer, different from the first portion, and rising up on the second lateral face of the body covered with the second adhesive layer;

totally polymerising the adhesive of the first and second layers and of the thermosetting resin of the first and second tongues;

removing the mould.

According to one variant, when the stiffening structure includes at least one cover base, the method further comprises, before the operation of placing at least one body on the main face of the non-polymerised plate, forming said at least one cover base with, for each cover base, the following successive operations:

forming a non-polymerised plate by draping layers of fibrous reinforcement pre-impregnated with a thermosetting resin on a mould;

totally polymerising the thermosetting resin of the plate;

placing an impression tool on the main face of the polymerised plate;

depositing a first adhesive layer on the plate;

forming the first and second tongues, respectively, by draping first layers of fibrous reinforcement pre-impregnated with a thermosetting resin on a first portion of the main face of the plate covered by the first adhesive layer and rising up on a first lateral face of the impression tool, and by draping second layers of fibrous reinforcement pre-impregnated with a thermosetting resin on a second portion of the main face of the plate covered by the first adhesive layer, different from the first portion, and rising up on a second lateral face of the impression tool;

partially polymerising the thermosetting resin of the first and second tongues and of the adhesive of the first layer;

removing the impression tool, whereby a housing is formed for at least one body;

depositing a second adhesive layer in the housing on the main face of the polymerised plate;

depositing a third adhesive layer on the first and second lateral faces of each body;

placing, in each housing, at least one body on the second adhesive layer, each body being positioned on the main face of the polymerised plate, preferably orthogonally to said main face, the second longitudinal edge of each body being pressed against the second adhesive layer of the main face of the plate;

totally polymerising the adhesive of the first, second and third layers and of the thermosetting resin of the first and second tongues of each cover base.

Using an impression tool makes it possible to form a housing in a base for at least one body, the impression tool being intended to be removed after partial polymerisation of the first and second tongues of the base.

Advantageously, when the stiffening structure includes a plurality of bodies, at least two bodies are disposed adjacent and are connected by at least one base, preferably a cover base.

According to one variant, for at least one base, the first and second layers of fibrous reinforcement intended to form the first and second tongues are the same set of layers that also cover the face of the plate that is opposite the main face.

Finally, the invention relates to a stiffened component obtained by implementing the stiffening method such as described above; preferably, the component to be stiffened is a satellite antenna reflector. The stiffening structure according to the invention may therefore be integrated on a face of a component to be stiffened, for example the rear face of an antenna reflector shell, even if this component has a specific shape, for example a double-curved shape.

The invention has numerous advantages. The stiffening structure and the stiffening method according to the invention make it possible to adapt easily to complex specific shapes of the surface of the component to be stiffened (the component may for example have a double curve), to reduce the manufacturing costs (particularly by drastically reducing the number of elements needed for the stiffening, simplifying their positioning on the component to be stiffened and reducing the various operations for bonding the stiffening structure in relation to the prior art). Finally, the invention makes it possible to ensure a good mechanical strength and a high reliability of the adhesive bonds.

BRIEF DESCRIPTION OF THE DRAWINGS

The present invention will be better understood upon reading the following description, given purely by way of indicative and non-limiting example, while referring to the appended drawings wherein:

FIG. 5b shows, according to a sectional view, a step of a mode of assembling a body with the base of FIG. 5a;

FIG. 5c shows, according to a sectional view, another step of a mode of assembling a body with the base of FIG. 5a;

Figure 1:
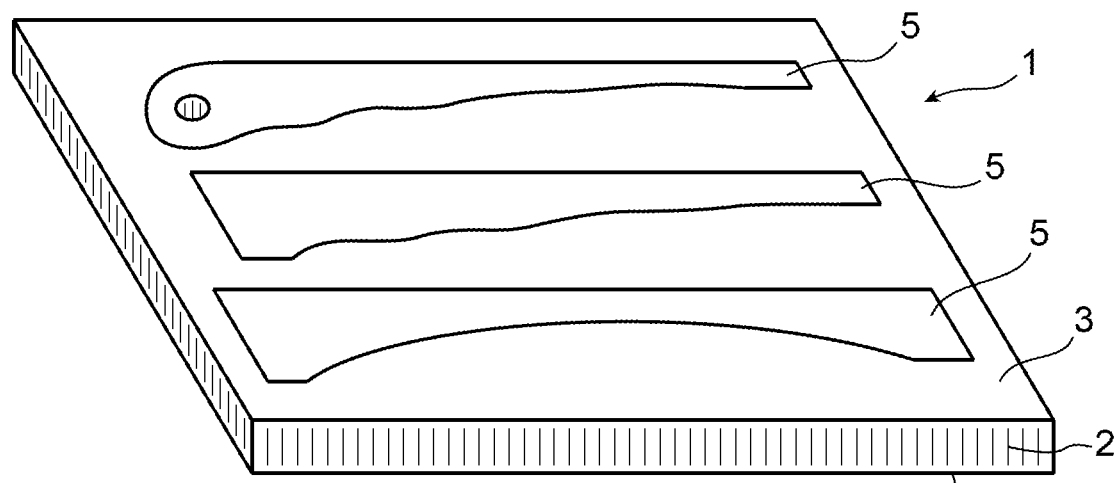
FIG. 1 shows a sandwich-type plate wherein the bodies of a stiffening structure are cut, produced according to a first embodiment of the invention.

It is specified that the various elements are not shown to scale.

DETAILED DESCRIPTION OF PARTICULAR EMBODIMENTS

As can be seen, a stiffening structure according to the invention includes at least one body and at least one base; if there is only one base, this will concern a mounting base. The stiffening structure may also include one or more cover bases.

In the stiffening structure according to the invention, the purpose of each body is to stiffen the final structure in a determined direction. Each body may be of the monolithic type, for example a monolithic plate, or be of the sandwich type, that is to say a laminate comprising a core and two skins located on either side of the core, which makes it possible to obtain an element having a significant stiffness, for a low overall weight.

The purpose of each mounting base, on the one hand, is to make the assembly between the body and the component to be stiffened possible and, on the other hand, to ensure a high reliability and a good mechanical strength of the adhesive bond.

The purpose of each cover base is to increase the inertia of the stiffening structure for a minimal size.

Each base, whether it is a mounting base or cover base, is intended to be positioned on and assembled with one or more bodies; it includes a plate and two tongues forming, according to a sectional view, a substantially "π" shaped straight section, the plate forming the head and the tongues forming the legs of the "π".

In the stiffening structure according to the invention, the body(ies), the mounting base(s) and the possible cover base(s) are made of composite material of the fibre-reinforced type impregnated by a thermosetting matrix. The same applies for the component to be stiffened. This is particularly what will make it possible to facilitate the assembly of these various elements by co-curing or by co-bonding, as will be seen below.

The fibrous reinforcement may be made of carbon and/or glass fibres and/or Kevlar™ fibres; it may also concern a combination of a plurality of types of fibres, for example a mixture of glass/carbon fibres, or of carbon/Kevlar™ fibres.

The matrix is a resin binder that impregnates the reinforcement and solidifies when it is polymerised. In the invention, the matrix is a thermosetting resin. The base monomer of the epoxy resin may for example be of the DGEBA (DiGlycidyl Ether of Bisphenol A), TGPAP (Tri-Glycidyl ParaAminoPhenol) or TGMDA (TetraGlycidyl Methylene DiAniline) type. The hardener may be of the amine type, for example DDS (DiaminoDiphenyl Sulfone).

For the fibrous reinforcement, fabrics or webs can be used and be stacked to form layers. A fibrous reinforcement pre-impregnated with thermosetting resin (also called "prepreg") can be used or a fibrous reinforcement can be impregnated with the resin. The resin-impregnated fibrous reinforcement may optionally be compacted before undergoing a polymerisation.

Generally, within the scope of the present invention, the assembly of two elements (whether this concerns a mounting base with the component to be stiffened or tongues with the body of a base) corresponds either to a bonding by co-curing, when the two assembled elements are not polymerised or partially polymerised and are brought to a state of complete polymerisation during the same heating cycle, or to a bonding by co-bonding, when one of the two elements is already completely polymerised, with the need to perform a surface preparation of the polymerised element and to dispose at the interface of the two elements an adhesive layer made of thermosetting resin. In other words, as soon as one element is totally polymerised, for it to be assembled to another element, an adhesive layer needs to be deposited at the bonding interface. Generally, a preparation of the bonding interface will be carried out for example by sanding and cleaning with a solvent, in order to subsequently deposit an adhesive film. In the case of a bonding by co-bonding, there are two heating cycles, a first cycle during which one of the two elements is completely polymerised and a second cycle during which the second element, as well as the adhesive, are completely polymerised. In the end, whether by bonding by co-curing or by co-bonding, a bond between the two elements by hot bonding is obtained, which has a high reliability and a very good mechanical strength.

Thus, according to a first example, the component to be stiffened may be in a partially polymerised state and the plate(s) of the mounting bases of the stiffening structure (if the plates are intended to be in contact with the component) also be in a partially polymerised state; in this case, the bond obtained after polymerisation resembles co-curing.

According to another example, the component to be stiffened may be completely polymerised before the installation of the stiffening structure; in this case, an adhesive layer will need to be deposited in order to obtain a bond by co-bonding.

Within the scope of the present invention, the polymerisation rate of a partial polymerisation is between 18% and 75% (ranges included), and preferably between 20% and 50%. This polymerisation rate is determined by DSC (Differential Scanning calorimetry) analysis according to the standard ISO 14322:2018.

In a known manner, the polymerisation is obtained by applying a heat treatment. For the resins used, the polymerisation temperature is generally between 120° C. and 220° C., with a polymerisation temperature stage between 1 h and 2 h. In the case of satellite antenna reflectors, epoxy resins are mainly used with a polymerisation at 180° C. for 2 h.

With reference to FIG. 1, a sandwich-type panel 1 is shown, which includes a core 2, an upper skin 3 and a lower skin 4, the two skins being located on either side of the core and bonded to it. The core may for example be a foam plate or a honeycomb structure. The two skins 3, 4 are made of a fibre-reinforced composite material and thermosetting matrix, for example carbon/epoxy. In this sandwich panel, cut-outs are subsequently carried out to obtain the bodies 5; in FIG. 1, three bodies 5 of different shapes have been cut out in the panel 1. The cut-out may be performed by machining the contours of each of the bodies 5. In the example illustrated, the panel 1 being of substantially flat shape, the bodies 5 have two opposite substantially parallel lateral faces 6, 7 and the cut-out corresponds to the edge faces of the bodies; the bodies 5 have a first curved longitudinal edge face 8 and a second straight longitudinal edge face 9, each longitudinal edge face connecting the first and the second lateral face with one another.

The first longitudinal edge face of each body is intended to come to be pressed against the plate of a mounting base, which itself is intended to be pressed against a surface of a component to be stiffened. Generally, the surface of the component to be stiffened is curved and the first edge face is therefore curved, its curve being adapted to the curve of the surface at the location where it is desired to install the stiffening structure.

Preferably, the second longitudinal edge face of each body is, for its part, straight. Indeed, as the purpose of the cover base is not to be assembled to the surface of the component to be stiffened, it will be preferred to associate it with a straight edge face of a body, in order to facilitate the assembly of this body and this all the more so when a plurality of bodies are assembled together. However, for size or weight considerations, a second curved edge face is possible. In this case, if a cover base is assembled, it must follow this curve.

Figure 2:
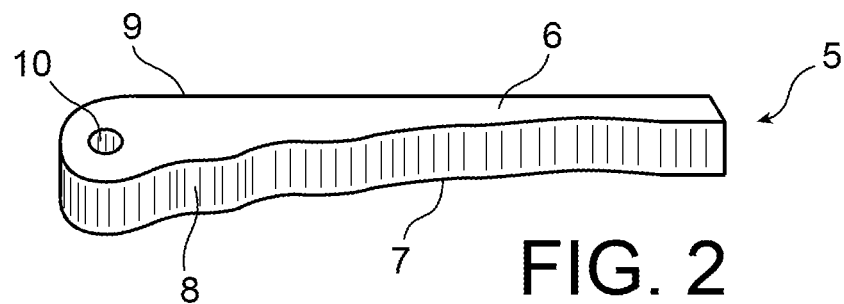
FIG. 2 shows one of the bodies of FIG. 1, after cutting by machining in the sandwich-type plate.

Apart from the cut-out of the first and second edge faces, ends of different shapes can be given to the bodies, which are adapted depending on whether it is desired to assemble a plurality of bodies with one another, assemble one or more with one another with brackets, etc. For example, the body shown in FIG. 2 includes a hole 10 in one of its ends, this hole being intended to receive, for example, a bracket.

Figure 3:
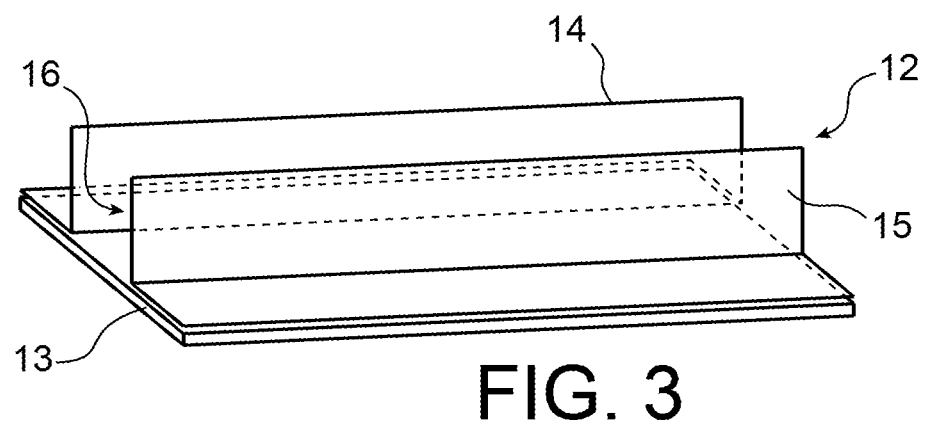
FIG. 3 shows a base according to the invention, which may be a cover base or a mounting base.

A base, whether this concerns a mounting base 11 or a cover base 12, includes a plate 13, as well as a first 14 and a second 15 tongue, which delimits, with the plate 13, a housing 16 for receiving one or more bodies 5. FIG. 3 shows a cover base 12.

With reference to FIGS. 4a-4d, each base, whether it concerns a mounting base and a cover base, defines a straight section substantially in the shape of "π" (the "π" here being shown with the head at the bottom), the plate forming the top of the "π" and the first and second tongues the legs of the "π".

Figure 4A:
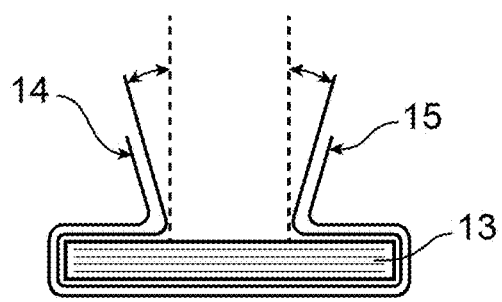
FIG. 4a shows an example of base, according to a sectional view, produced according to one embodiment.
Figure 4B:
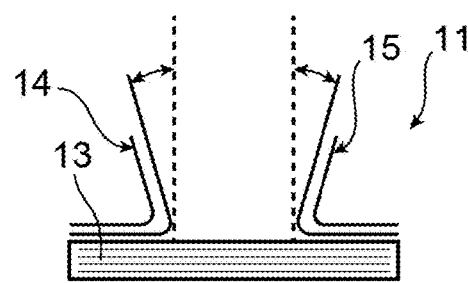
FIG. 4b shows another example of base, according to a sectional view, produced according to another embodiment.
Figure 4C:
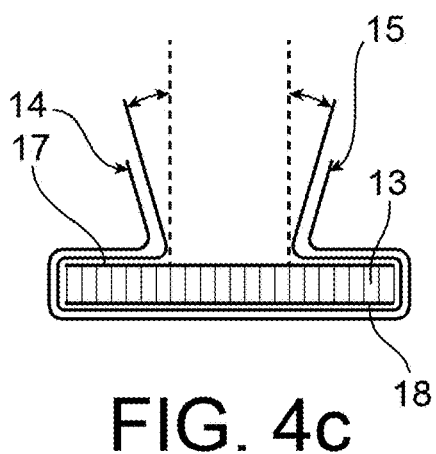
FIG. 4c shows another example of base, according to a sectional view, produced according to another embodiment.
Figure 4D:
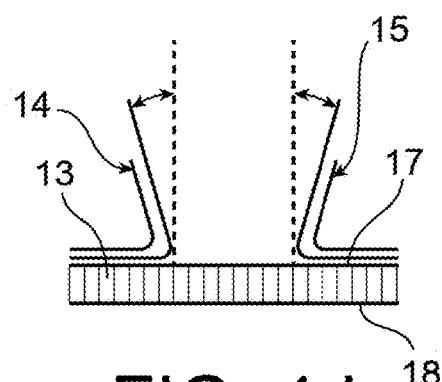
FIG. 4d shows another example of base, according to a sectional view, produced according to another embodiment.

The plate 13 of the cover base may be of the monolithic type, obtained for example by draping layers of fibrous reinforcement pre-impregnated with a thermosetting resin (FIGS. 4a and 4b), or be of the sandwich type with a core and two skins bonded on either side of the core (FIGS. 4c and 4d).

In the case of a cover base, the thermosetting resin of the plate is, preferably, completely polymerised before forming the tongues, which makes it possible for the plate to maintain its shape during the polymerisation of the tongues.

On the contrary, in the case of a mounting base, the plate can only be monolithic. The thermosetting resin of the plate is, firstly, not polymerised or partially polymerised during the formation of the mounting base; then, secondly, when the mounting base is assembled with the component to be stiffened, the complete polymerisation of the thermosetting resin of the plate of the mounting base is carried out, so that the bond between the component and the mounting base is optimal.

The first and second tongues 14 and 15 of each base are formed by draping, respectively, first and second layers of fibrous reinforcement pre-impregnated with a thermosetting resin; they may be draped locally on the main face 17 of the plate and rise up on the lateral faces of the body (FIGS. 4b and 4d) or, in the particular case of a cover base, be draped around the plate (covering the face 18 opposite the main face 17) (FIGS. 4a and 4c). In this case, the first and second layers of fibrous reinforcement impregnated with a thermosetting resin form one and the same set of layers of fibrous reinforcement pre-impregnated with a thermosetting resin.

Figure 5A:
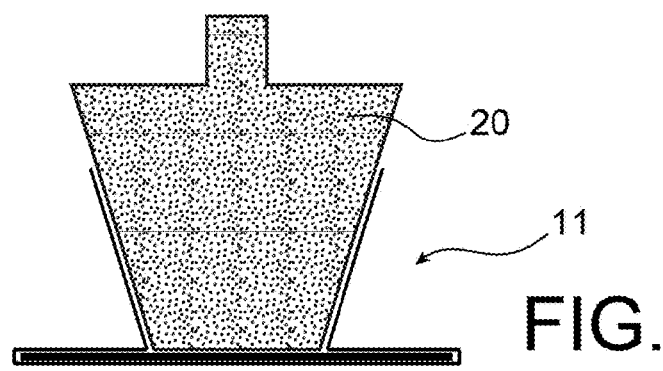
FIG. 5a shows, according to a sectional view, a mode of forming a base with the aid of an impression tool and the first and second tongues of which are partially polymerised.
Figure 5B:
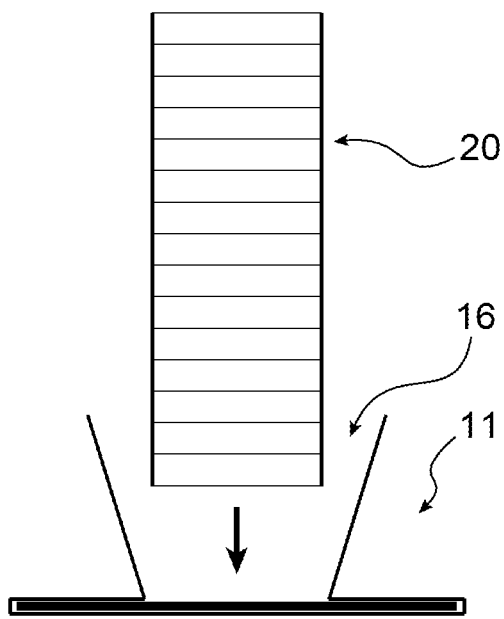
Figure 5C:
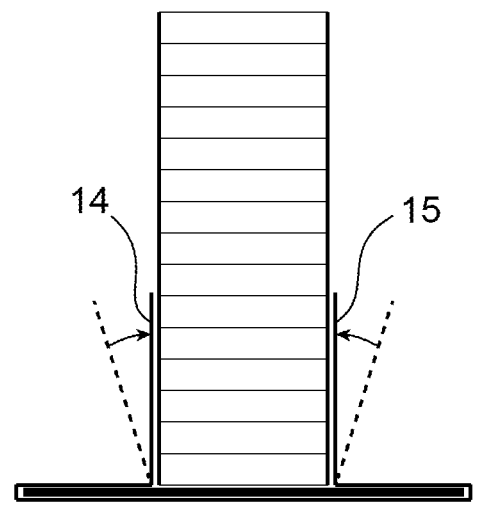
Figure 6:
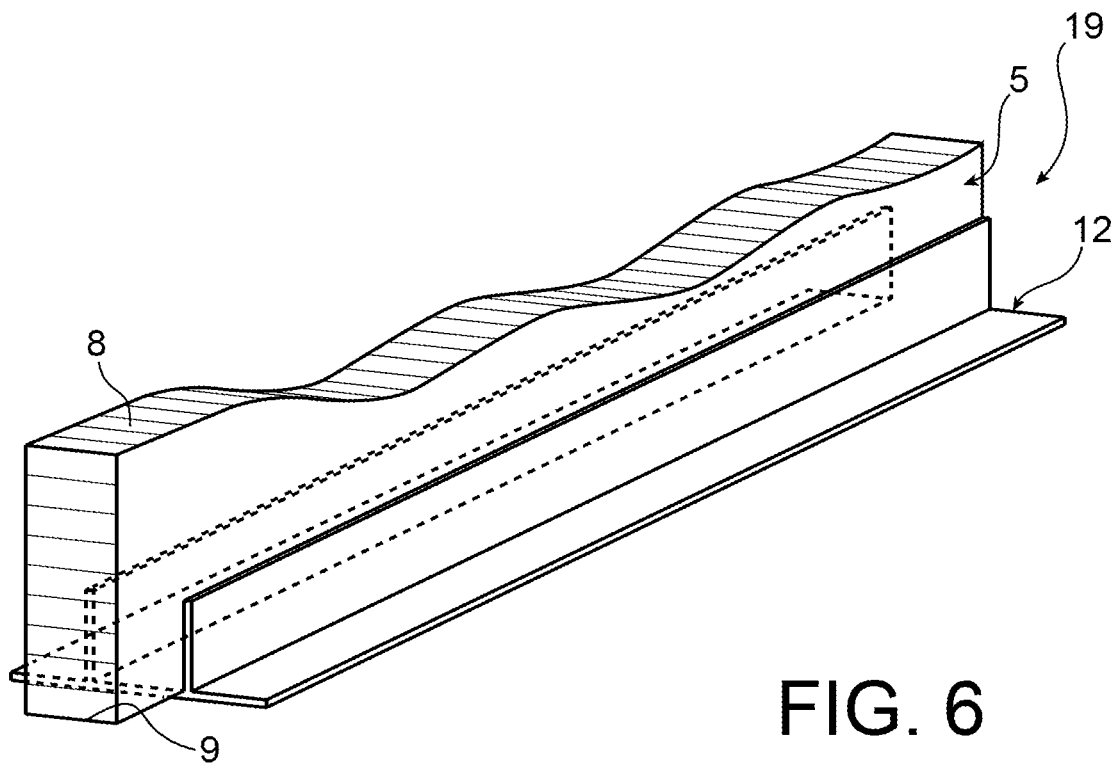
FIG. 6 shows an example of intermediate embodiment of a stiffening structure according to the invention, comprising a body with a first curved edge face and a second straight edge face, and a cover base; the embodiment is referred to as "intermediate" because, to be complete, the stiffening structure must be assembled in a second stage to a mounting base (which is therefore not yet shown)
Figure 7:
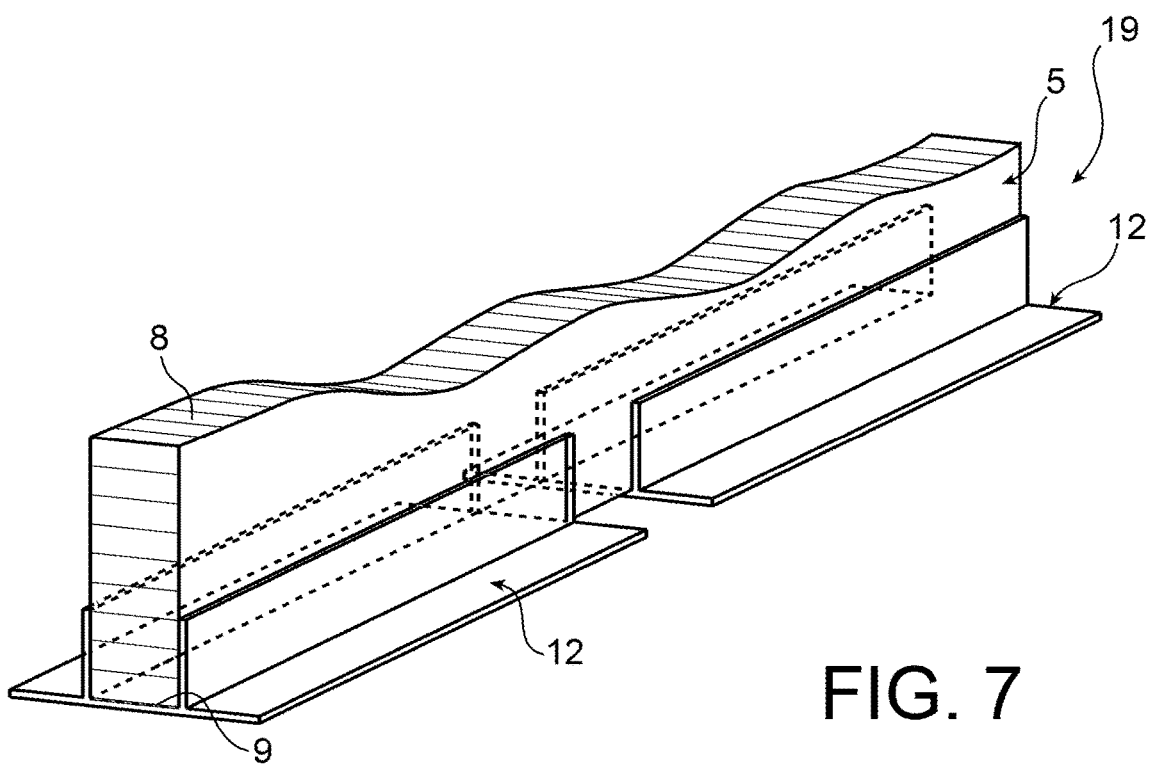
FIG. 7 shows another example of intermediate embodiment of a stiffening structure according to the invention, comprising two cover bases (the mounting base not being shown, because not yet assembled)

A base, whether this is a mounting base 11 or a cover base 12, may be produced directly on the body(ies) 5 to which it must be assembled or be produced separately on an impression tool 20 (FIG. 5a), in order to subsequently be detached from this impression tool and be assembled to the body(ies) 5 (FIGS. 5b and 5c).

If the tongues 14, 15 of the base are produced on an impression tool 20, the first and second tongues may be disposed on the plate 13 and pressed against the impression tool, having the shape of the body intended to be assembled with the base, then the tongues are partially polymerised (FIG. 5a). The impression tool is subsequently removed, the body is placed in the housing of the base (FIG. 5b) and the complete polymerisation of the resin of the tongues is carried out. During the complete polymerisation, the resin softens and the first and second tongues come to conform (press) against the lateral faces of the body. They fold respectively on the first and second lateral faces 6, 7 of the body, in such a way as to cover at least partially these two faces (FIG. 5c).

Advantageously, when an impression tool 20 is used to form the tongues of the base (whether it is mounting or cover), this impression tool is sized in such a way that the tongues forming the legs of the "π" of the base are spaced apart by an angle greater than what they would have been by being pressed against the body. Thus, if the body has parallel lateral faces, it is made sure that the tongues are not parallel and form an angle α slightly open in relation to the perpendicular at the plane of the plate (for example, an open angle of 10 to 15°) (FIGS. 4a-4d). This makes it possible to facilitate the subsequent insertion of the body into the housing (FIGS. 5a to 5c). Preferably, the impression tool is made of elastomer, which makes it possible for the impression tool to adapt well to the curve of the surface of the plate and facilitate its extraction from the housing of the base after partial polymerisation.

A plurality of examples of a stiffening structure 19 are shown in FIGS. 6 to 10. The body 5 includes a first curved edge face 8, a second straight edge face 9, the second edge face being pressed against the plate 13 of one or more cover bases 12. In FIGS. 6 to 10, the mounting base has not been shown for the sake of simplification. It should be noted that what is said for a cover base is also valid for a mounting base.

The stiffening structure 19 may include only one cover base 12 (FIG. 6) or a plurality of adjacent cover bases 12 (FIG. 7) for the same body 5. The cover bases may be joining or not (with or without overlap between the adjacent bases). Likewise, the stiffening structure may include only one or a plurality of mounting bases, joining or not.

Figure 8:
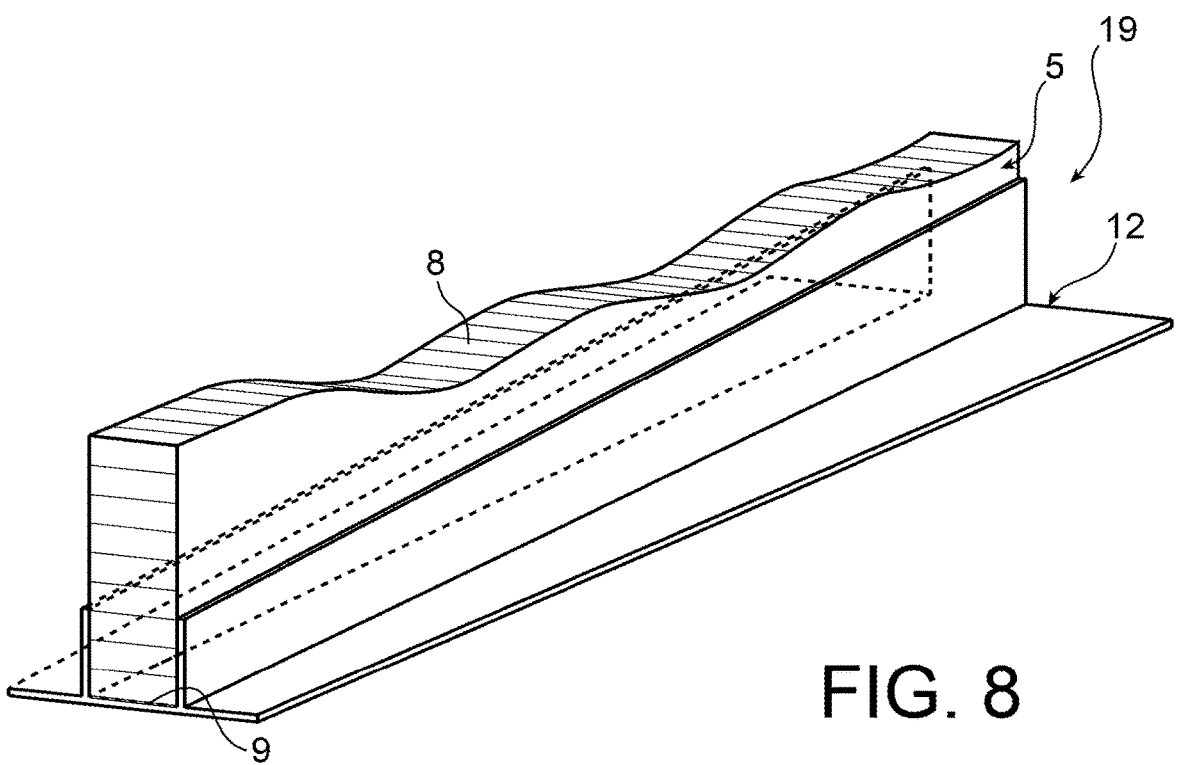
FIG. 8 shows another example of intermediate embodiment of a stiffening structure according to the invention, wherein the cover base has a variable plate width and also a variable tongue height.

A cover base or a mounting base may have first 14 and second 15 tongues of variable heights, and/or a plate 13 of variable width, as illustrated in FIG. 8.

Figure 9:
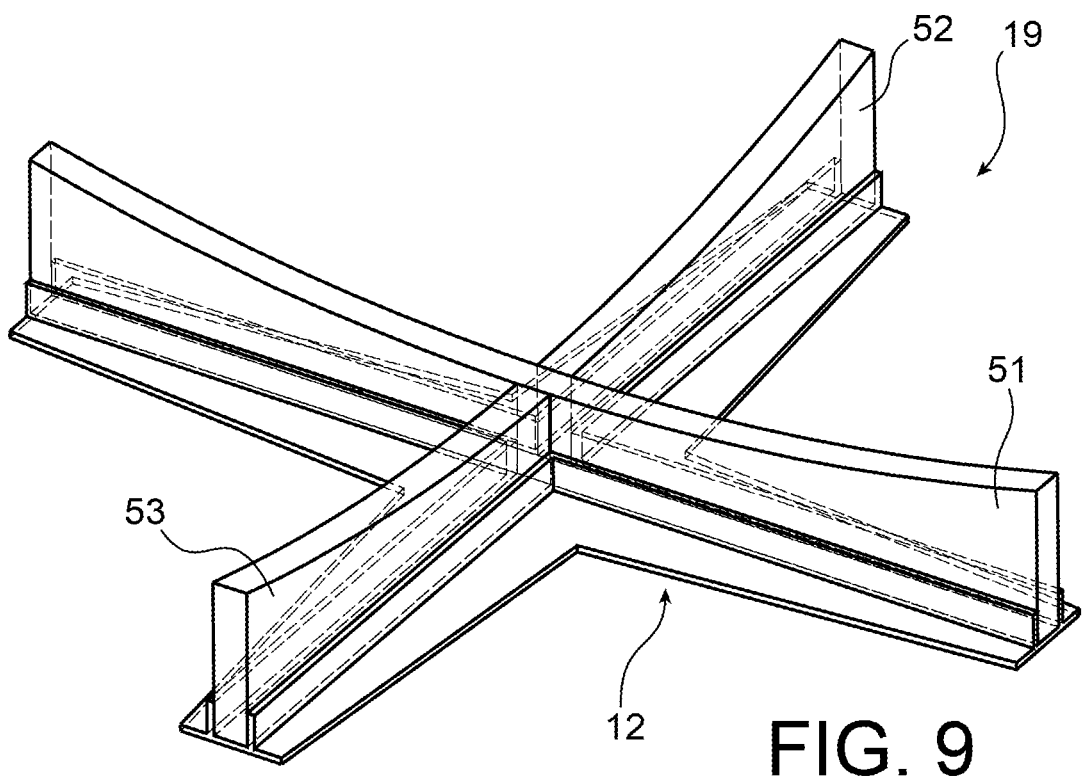
FIG. 9 shows another example of intermediate embodiment of a stiffening structure according to the invention, including a plurality of bodies connected by one and the same cover base, which forms a cross-shape housing making it possible to house the set of bodies.

The stiffening structure may include a plurality of bodies 5, which are then made secure by one or more bases disposed straddling these bodies. FIG. 9 shows an example of three bodies 51, 52, 53 connected by a single cover base 12; here, the cover base has a cross-shaped housing 16 with its two branches at right angles, one of the three bodies (body 51) being disposed in one of the branches and the other two bodies 52, 53 in each of the halves of the other branch. The fact of using the same cover base to connect a plurality of bodies makes it possible to easily constitute an array of bodies, prior to the assembly with the component to be stiffened. The fact of having an array of bodies makes it possible to facilitate and ensure an accurate positioning of these bodies on the component.

Figure 10:
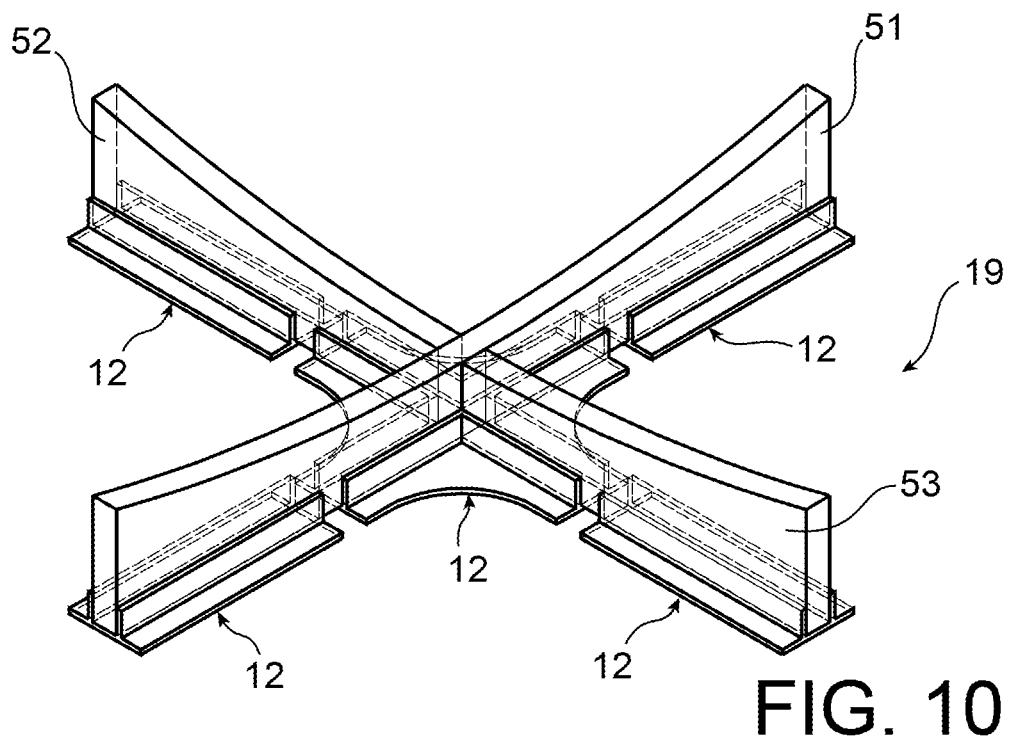
FIG. 10 shows another example of intermediate embodiment of a stiffening structure according to the invention, including a plurality of bodies connected by one and the same cover base, which forms a cross-shaped housing making it possible to house a portion of each of the bodies and to secure them, and other cover bases each making it possible to house another portion of a body.

FIG. 10 shows another example where the three bodies 51, 52, 53 here are connected by a central cover base, each of the bodies further including at least one other cover base. The cover bases may be joining or not (as is the case here).

Figure 11:
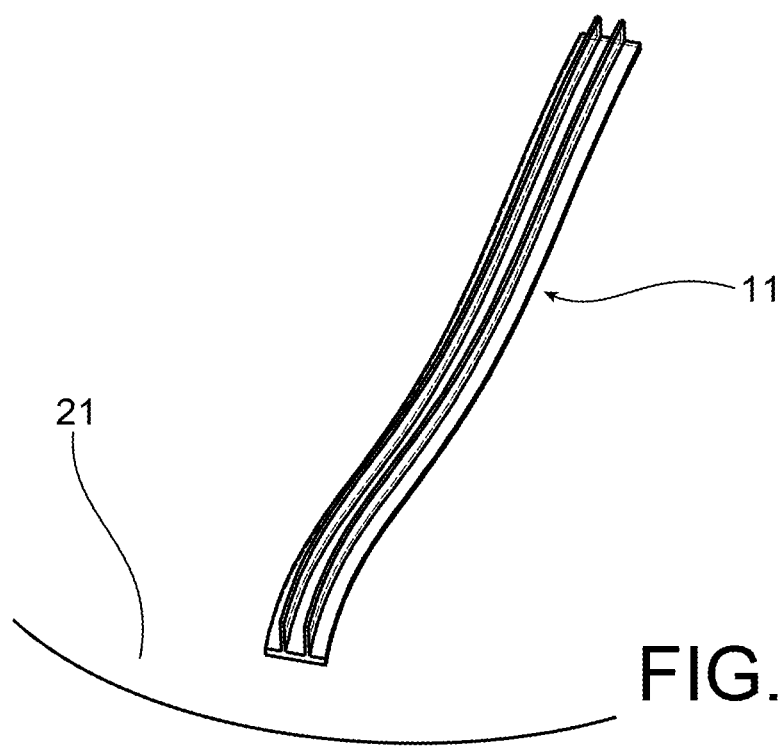
FIG. 11 shows an example of a component that must be stiffened, wherein a single mounting base is shown according to the invention. This mounting base follows the shape of the surface of the component to be stiffened and possesses a housing intended to receive one or more bodies disposed longitudinally.

FIG. 11 shows a mounting base 11 integral with a support 21. The support may be the component to be stiffened, if the mounting base is produced directly on the component, or a mould (that is used as temporary manufacturing support), intended to be removed once the mounting base has been produced. This mould has the same surface as the component that must be stiffened. Here, the mounting base is shown without the body, but it can be observed that the mounting base is intended to receive a body having a first curved edge face. If a mould (for example the mould of the component to be stiffened, if the component is intended to be obtained by draping on a mould) is used, it must correspond to the shape of the component to be stiffened, and the mounting base must be positioned by taking into account the positioning constraint of the body(ies) of the stiffening structure on the component.

Figure 12:
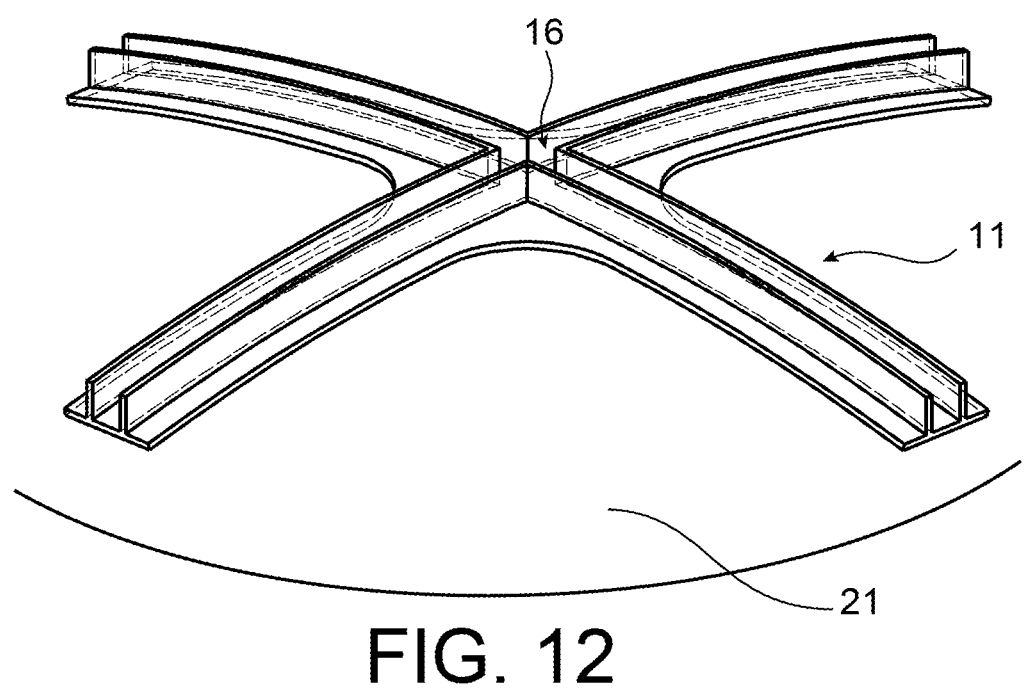
FIG. 12 shows an example of a component that must be stiffened, including a single mounting base according to the invention, following the shape of the component to be stiffened and having a housing intended to receive a plurality of adjacent bodies.

FIG. 12 shows a mounting base 11 delimiting a cross-shaped housing 16, capable of receiving a plurality of bodies. As in FIG. 11, the mounting base is integral with a support 21, which may be the component to be stiffened or a mould that is used as temporary manufacturing support. This cross-shaped mounting base may be partially polymerised.

Figure 13:
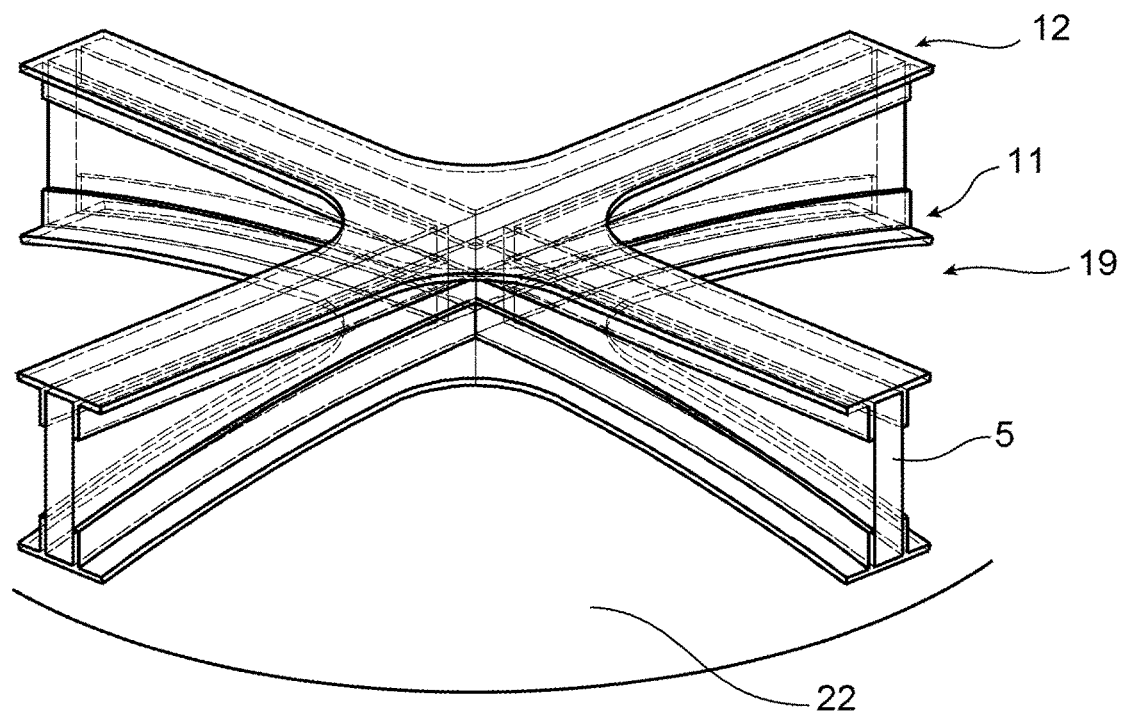
FIG. 13 shows the component to be stiffened of FIG. 12, which, after assembling the bodies and the cover base, becomes a stiffened component.

FIG. 13 shows the example of a stiffening structure 19 that includes a plurality of bodies 5, connected together by one and the same cover base 12 and one and the same mounting base 11, and that forms an array of bodies integral with one another; the stiffening structure 19 is attached to the component to be stiffened 22 during a final polymerisation step.

Here it is possible to see that the first edge face of each of the bodies is curved to be adapted to the curved shape of the component to be stiffened, at the location where the body is intended to be positioned; the second edge face of each of the bodies is for its part straight, which facilitates the formation of the array of secure bodies.

For the sake of simplification, only a radial stiffening has been shown (for example, a simple radial stiffening in FIG. 11 and a cross-shaped radial stiffening in FIG. 12). However, the method according to the invention makes it possible to produce any type of stiffening by assembling at least one body on the surface of the component to be stiffened via at least one mounting base. It may concern a radial stiffening, a circumferential stiffening, a combination of a radial stiffening and of a circumferential stiffening, etc. Preferably, the stiffening structure includes a plurality of bodies forming an array.

The body(ies) 5, 51, 52, 53 of the stiffening structure 19 may be of large dimensions and cross the entire length (or diameter) of the component to be stiffened 22; they may on the contrary be of smaller dimensions, in such a way as to locally stiffen the component; they may also extend outside of the surface of the component to be stiffened.

The embodiment of the stiffening structure 19 according to the invention makes numerous different assembly modes possible with the component to be stiffened 22.

According to a first example, if the stiffening structure includes a mounting base the plate of which is partially polymerised and that the component to be stiffened is not polymerised, it is sufficient to assemble them to accurately position the stiffening structure directly on the surface of the component to be stiffened, the plate of the mounting base being opposite the surface of the component to be stiffened not polymerised (the bond being intended to be carried out between the plate of the mounting base and the component to be stiffened). The final polymerisation of the whole thus formed is subsequently carried out. During the final polymerisation, the partially polymerised resin of the plate of the mounting base will soften (reduction of the viscosity), making possible a perfect conformation of the plate with the surface of the component to be stiffened. Thus, a mounting base/component joint is obtained without stress by hot bonding resembling co-curing. During the final polymerisation, there is a creation of bonds between the polymer chains of the resin of the plate of the mounting base with the polymer chains of the resin of the component to be stiffened. Thus, it is not necessary to perform a surface preparation before the assembly, or position an adhesive film at the mounting base/component to be stiffened interface.

In order to obtain an accurate positioning of the stiffening structure on the component to be stiffened, or of the various elements constituting the stiffening structure during its manufacture, it is possible to use a laser projection of the contour of the location where the stiffening structure must be positioned.

According to another example, it is possible to have, on the one hand, an array of at least two bodies secured by at least one cover base, the tongues of the cover base being in a partially polymerised state, and, on the other hand, mounting bases produced on the surface of the component to be stiffened and having a housing intended to receive the array of bodies and that is obtained with the aid of an impression tool, the tongues and the plate of the mounting bases themselves also being in a partially polymerised state. The assembly of the array of bodies with the mounting bases on the component to be stiffened is performed by carrying out an accurate positioning of the array of bodies in the dedicated housing, then a total polymerisation of the whole. During the total polymerisation, the partially polymerised resin of the tongues of the mounting bases will soften, making a perfect conformation possible between, on the one hand, the plate of each mounting base with the surface of the component to be stiffened (a mounting base/component to be stiffened joint is obtained without stress by hot bonding resembling co-curing) and, on the other hand, the tongues of the mounting bases with the skins of the bodies of the array (a mounting base/body joint is obtained without stress by hot bonding resembling co-bonding).

Figure 14:
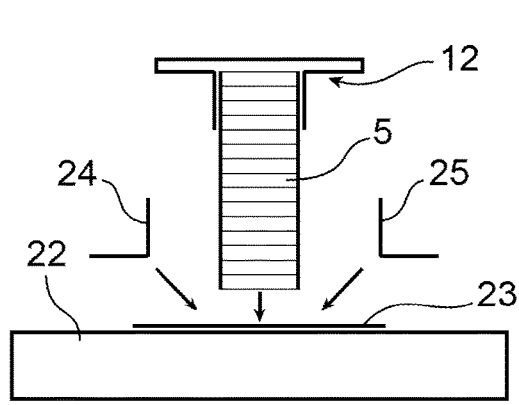
FIG. 14 shows, according to a sectional view, an embodiment of a stiffening structure according to the invention.

According to another example shown in FIG. 14, the plate may be formed of a mounting base 11 by carrying out a draping 23 of plies or webs pre-impregnated with thermosetting resin on the component to be stiffened 22, placing a body 5 there provided here with a cover base 12 and using the body 5 to directly drape the pre-impregnated plies 24, 25 (intended to form the first 14 and second 15 tongues of the mounting base) on the non-polymerised plies 23 (intended to form the plate 13 of the mounting base); the assembly of the various elements is obtained by performing a complete polymerisation of the resin of the component 22 to be stiffened, of the resin of the plies 23 of the plate of the mounting base, of the resin of the plies 24, 25 of the tongues of the mounting base and of the resin of the body 5.

Figure 15:
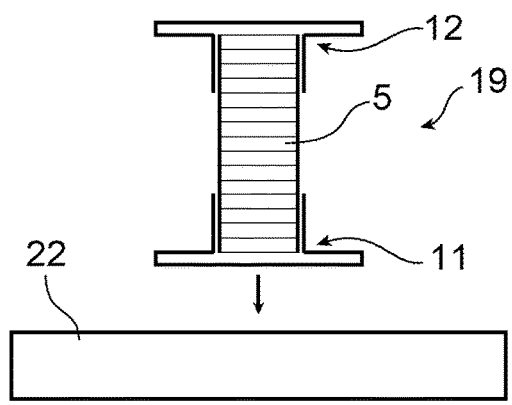
FIG. 15 shows, according to a sectional view, another embodiment of a stiffening structure according to the invention.

According to another example shown in FIG. 15, a stiffening structure is produced here including a body 5 and a cover base 12, as well as a mounting base 11 of which the resin of the plate 13 and of the tongues 14 and 15 is partially polymerised; this stiffening structure 19 is placed on the component 22 to be stiffened and the assembly is obtained by performing a complete polymerisation of the resin of the component 22 to be stiffened and of the resin of the plate 13 and of the tongues 14 and 15 of the mounting base.

What is claimed is:

1. A stiffening method for stiffening a component by a stiffening structure, the component being made of a composite material the thermosetting resin of which is not polymerised or partially polymerised, and the stiffening structure being fitted to at least one of the surfaces of the component, wherein the stiffening structure comprises:
   at least one body extending in a longitudinal direction, each body having a first and a second longitudinal edge face on opposite sides, and a first and a second lateral face on opposite sides;
   at least one base including at least one mounting base, each base being provided with a plate and a first and a second tongue which delimit, with the plate, a housing for at least one body, the first and the second tongue extending from a main face of the plate and being pressed respectively against the first and the second lateral face of the body;
   and wherein each base the plate of which is secured to the first longitudinal edge face of a body is a mounting base, the plate of each mounting base being intended to be pressed against the surface of the component to be stiffened; and
   each body and each base are made of thermosetting composite material;
   the method comprising the successive steps of:
   a) supplying the body (ies) made of thermosetting composite material of the stiffening structure;
   b) for at least one mounting base of the stiffening structure, performing the following successive operations:
   forming a non-polymerised plate by draping layers of fibrous reinforcement pre-impregnated with a thermosetting resin on the surface of the component to be stiffened;
   placing an impression tool on the main face of the non-polymerised plate;
   forming the first and second tongues, respectively, by draping first layers of fibrous reinforcement pre-impregnated with a thermosetting resin on a first portion of the main face of the plate and rising up on a first lateral face of the impression tool, and by draping second layers of fibrous reinforcement pre-impregnated with a thermosetting resin on a second portion of the main face of the plate, different from the first portion, and rising up on a second lateral face of the impression tool;
   partially polymerising the thermosetting resin of the component, of the plate and of the first and second tongues;
   removing the impression tool, whereby a housing is formed for at least one body;
   depositing an adhesive layer in the housing on the main face of the partially polymerised plate;
   placing at least one body in the housing on the adhesive layer, the first longitudinal edge face of each body being pressed against the adhesive layer of the main face of the plate;
   and for the possible other mounting base(s) of the stiffening structure, performing the following successive operations:
   forming a non-polymerised plate by draping layers of fibrous reinforcement pre-impregnated with a thermosetting resin on the surface of the component to be stiffened;
   placing at least one body on the main face of the non-polymerised plate, the first longitudinal edge face of each body being pressed against the adhesive layer of the main face of the plate;
   forming the first and second tongues, respectively, by draping first layers of fibrous reinforcement pre-impregnated with a thermosetting resin on a first portion of the main face of the plate and rising up on a first lateral face of the body, and by draping second layers of fibrous reinforcement pre-impregnated with a thermosetting resin on a second portion of the main face of the plate, different from the first portion, and rising up on a second lateral face of the body;
   c) securing each mounting base with the surface of the component to be stiffened and of the body (ies) by totally polymerising the thermosetting resin of the plate, of the first and second tongues and of the component.

2. The stiffening method according to claim 1, wherein 9 the at least one base of the stiffening structure further comprises at least one cover base, and the method further comprises, before the operation of placing at least one body on the main face of the non-polymerised plate of each mounting, forming said at least one cover base by performing the following successive operations for each cover base:
   forming another non-polymerised plate by draping layers of fibrous reinforcement pre-impregnated with a thermosetting resin on a mould;
   totally polymerising the thermosetting resin of the other non-polymerised plate;
   depositing a first adhesive layer on the main face of the polymerised plate;
   placing at least one body on the first adhesive layer, each body being positioned on the main face of the polymerised plate, orthogonally to said main face, the second longitudinal edge face of each body being pressed against the first adhesive layer of the main face of the polymerised plate;
   depositing a second adhesive layer on the first and second lateral faces of each body;
   forming the first and second tongues of the cover base, respectively, by draping first layers of fibrous reinforcement pre-impregnated with a thermosetting resin on a first portion of the main face of the plate covered by the first adhesive layer and rising up on the first lateral face of the body covered with the second adhesive layer, and by draping second layers of fibrous reinforcement pre-impregnated with a thermosetting resin on a second portion of the main face of the plate covered by the first adhesive layer, different from the first portion, and rising up on the second lateral face of the body covered with the second adhesive layer;
   totally polymerising the adhesive of the first and second adhesive layers and of the thermosetting resin of the first and second tongues of the cover base;
   removing the mould.

3. The stiffening method according to claim 2, wherein each body is provided with at least one cover base and at least one mounting base, a cover base being a base the plate of which is secured to the second longitudinal edge face of a body, and wherein the stiffening structure comprises a plurality of bodies, at least one base is being disposed straddling at least two adjacent bodies in order to secure them.

4. The stiffening method according to claim 3, wherein each body is connected to at least one adjacent body by at least one base.

5. The stiffening method according to claim 3, wherein the housing of the base disposed straddling at least two adjacent bodies has a cross shape.

6. The stiffening method according to claim 3, wherein the base disposed straddling at least two adjacent bodies is a cover base.

7. The stiffening method according to claim 1, wherein the at least one base of the stiffening structure including-further comprises at least one cover base, and the method further comprises, before the operation of placing at least one body on the main face of the non-polymerised plate of each mounting, forming said at least one cover base by performing the following successive operations for each cover base:
- forming another non-polymerised plate by draping layers of fibrous reinforcement pre-impregnated with a thermosetting resin on a mould;
- totally polymerising the thermosetting resin of the other non-polymerised plate;
- placing an impression tool on the main face of the polymerised plate;
- depositing a first adhesive layer on the plate;
- forming the first and second tongues of the cover base, respectively, by draping first layers of fibrous reinforcement pre-impregnated with a thermosetting resin on a first portion of the main face of the plate covered by the first adhesive layer and rising up on a first lateral face of the impression tool, and by draping second layers of fibrous reinforcement pre-impregnated with a thermosetting resin on a second portion of the main face of the plate covered by the first adhesive layer, different from the first portion, and rising up on a second lateral face of the impression tool;
- partially polymerising the thermosetting resin of the first and second tongues of the cover base, and of the adhesive of the first adhesive layer;
- removing the impression tool, whereby a housing is formed for at least one body;
- depositing a second adhesive layer in the housing on the main face of the polymerised plate;
- depositing a third adhesive layer on the first and second lateral faces of each body;
- placing, in each housing, at least one body on the second adhesive layer, each body being positioned on the main face of the polymerised plate, orthogonally to said main face, the second longitudinal edge of each body being pressed against the second adhesive layer of the main face of the plate;
- totally polymerising the adhesive of the first, second and third adhesive layers and of the thermosetting resin of the first and second tongues of the cover base.

8. The stiffening method according to claim 1, wherein the stiffening structure comprises a plurality of bodies, and at least two bodies are disposed adjacent each other and are connected by at least one cover base.

9. The stiffening method according to claim 1, wherein, for at least one base, the first and second layers of fibrous reinforcement intended to form the first and second tongues are the same set of layers that also cover the face of the plate that is opposite the main face.

10. The stiffening method according to claim 1, wherein the first edge face of at least one body has a single curve or a double curve.

11. The stiffening method according to claim 10, wherein the second edge face of at least one body is straight.

* * * * *